US007606785B1

(12) United States Patent
Shirriff

(10) Patent No.: US 7,606,785 B1
(45) Date of Patent: Oct. 20, 2009

(54) CONCURRENT A-BOX AND T-BOX GENERATION FOR USE IN WEB ONTOLOGY LANGUAGE (OWL) DATABASE AND KNOWLEDGE BASE CONSTRUCTION

(75) Inventor: Kenneth Shirriff, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 769 days.

(21) Appl. No.: 10/923,291

(22) Filed: Aug. 20, 2004

(51) Int. Cl.
*G06N 5/02* (2006.01)
*G06N 5/04* (2006.01)
*G06F 17/00* (2006.01)

(52) U.S. Cl. .............................. 706/59; 706/48; 706/61; 707/101

(58) Field of Classification Search ................... 706/59, 706/50, 48, 61; 701/101
See application file for complete search history.

(56) References Cited

OTHER PUBLICATIONS

Jena, "Jena—A Semantic Web Framework for Java", 2002.*
Jena, "Jena—A Semantic Web Framework for Java", Dec. 23, 2003.*
Goldstein, Processing XML: XSLT, A Matter of Style, 2000.*
Haarslev et al., RACER User's Guide and Reference Manual Version 1.6, 2001.*
Laks V. S. Lakshmanan et al., "XML Interoperability," International Workshop on the Web and Databases (WebDB), Jun. 12-13, 2003, San Diego, California, pp. 6 pages.
Mark Greaves, "The DARPA Agent Markup Language Homepage," http://www.daml.org/, data retrieved Nov. 29, 2004, pp. 1-2.
W3C, "Web-Ontology (WebOnt) Working Group (Closed)," Jun. 15, 2004. http://www.w3.org/2001/sw/Webnt/, data retrieved Nov. 29, 2004, pp. 1-8.
Stanford Medical Informatics, "Welcome to the Protègè Project," http://protégé.stanford.edu/, 7 pages.
The Mindswap Group, "Mindswap," http://www.mindswap.org/, data retrieved Nov. 29, 2004, pp. 1-3.
Tim Berners-Lee et al., "The Semantic Web," May 2001, *Scientific American, Inc.*, www.sciam.com, pp. 35-42.
Franz Baader, et al. (2003). *The Description Logic Handbook.* Cambridge University Press, pp. 1-555.

* cited by examiner

*Primary Examiner*—David R Vincent
*Assistant Examiner*—Nathan H Brown, Jr.
(74) *Attorney, Agent, or Firm*—Osha • Liang LLP

(57) ABSTRACT

In accordance with one embodiment of the present invention, there are provided mechanisms and methods for implementing concurrent generation of an a-box and a t-box for use in a computing environment comprising a knowledge system. A t-box comprises categories and relationships about the categories and an a-box, comprising assertions of individual instances of the categories of the t-box. With these mechanisms and methods, it is possible to process structured information into a form usable by a knowledge engine.

31 Claims, 15 Drawing Sheets

```xml
<?xml version="1.0" encoding="ISO-8859-1" ?>
<DATACENTER id="datacenter1">                              ⟋512
  <OS name="Unix" />                                       ⟋507
  <OS name="Solaris9" implements="Solaris" />              ⟋506
  <OS name="Solaris" implements="Unix" />                  ⟋508
  <OS name="Linux" implements="Unix" />                    ⟋510
<MACHINE name="Server1">                                   ⟋504
    <HARDWARE_TYPE>Sun 4U</HARDWARE_TYPE>                  ⟋503
    <INSTALLED_OS>Solaris9</INSTALLED_OS>                  ⟋501
</MACHINE>
<MACHINE name="Server2">                                   ⟋502
    <HARDWARE_TYPE>Sun Fire V20z</HARDWARE_TYPE>           ⟋513
    <INSTALLED_OS>Linux</INSTALLED_OS>                     ⟋511
    <DNS_SERVER server_name="Server1" />                   ⟋515
</MACHINE>
</DATACENTER>
```

*Fig. 5A*

```
<tag name="DATACENTER">                                              540
<createResource type="Datacenter" id="@id" comment="Description of a
    datacenter.">
<tag name="MACHINE">                                                 550
<createResource type="Machine" id="@name" comment="A machine in the
    datacenter.">
<createPropertyLink property="hasMachine" fromResource="parent"
    toResource="current" comment="The machine is part of the
    datacenter." />                                                  554
<tag name="DNS_SERVER">
<createPropertyLink property="dns_server" fromResource="current"
    toName="@server_name" comment="The DNS server the
    machine uses." />                                                556
</tag>
<tag name="HARDWARE_TYPE">
 <createLiteralResource type="string" value="text()">
<createPropertyLink property="hardwareType"
    fromResource="parent" toResource="current" cardinality="1"
 comment="The type of hardware." />
</createLiteralResource>
</tag>                                                               558
<tag name="INSTALLED_OS">
<createPropertyLink property="installed_os" fromResource="current"
    toName="text()" comment="The OS installed on the machine." />
</tag>
</createResource>
</tag>
<tag name="OS">                                                      552
<createSubclass type="OS" id="@name" subclassOf="@implements"
    comment="Describes an operating system." />
</tag>
</createResource>
</tag>
```

| Fig. 5D1 |
|---|
| Fig. 5D2 |

```xml
<rdf:RDF xmlns:n1="http://n1.sun.com/#" xmlns:rdf="http://www.w3.
org/1999/02/22-rdf-syntax-ns#" xmlns:owl="http://www.w3.
org/2002/07/owl#" xmlns:rdfs="http://www.w3.org/2000/01/rdf-schema#">
  <owl:Class rdf:about="http://n1.sun.com/#OS">
  <rdfs:comment>Describes an operating system.</rdfs:comment>
  </owl:Class>
  <owl:Class rdf:about="http://n1.sun.com/#Datacenter">
  <rdfs:comment>Description of a datacenter.</rdfs:comment>
  </owl:Class>
  <owl:Class rdf:about="http://n1.sun.com/#Machine">
  <rdfs:comment>A machine in the datacenter.</rdfs:comment>
  <rdfs:subClassOf>
  <owl:Restriction>
  <owl:onProperty>
  <owl:DatatypeProperty rdf:about="http://n1.sun.com/#hardwareType" />
  </owl:onProperty>
  <owl:cardinality rdf:datatype="http://www.w3.org/2001/XMLSchema
#nonNegativeInteger">1</owl:cardinality>
  </owl:Restriction>
  </rdfs:subClassOf>
  </owl:Class>
  <owl:ObjectProperty rdf:about="http://n1.sun.com/#hasMachine">
  <rdfs:comment>The machine is part of the datacenter.</rdfs:comment>
  <rdfs:domain rdf:resource="http://n1.sun.com/#Datacenter" />
  <rdfs:range rdf:resource="http://n1.sun.com/#Machine" />
  </owl:ObjectProperty>
  <owl:DatatypeProperty rdf:about="http://n1.sun.com/#hardwareType">
  <rdfs:comment>The type of hardware.</rdfs:comment>
  <rdfs:range rdf:resource="http://www.w3.org/2001/XMLSchema#string" />
  <rdfs:domain rdf:resource="http://n1.sun.com/#Machine" />
  </owl:DatatypeProperty>
  <n1:OS rdf:about="http://n1.sun.com/example1#Unix" />
  <rdf:Description rdf:about="http://n1.sun.com/#installed_os">
  <rdfs:comment>The OS installed on the machine.</rdfs:comment>
  </rdf:Description>
  <n1:OS rdf:about="http://n1.sun.com/example1#Solaris">
  <rdfs:subClassOf rdf:resource="http://n1.sun.com/example1#Unix" />
```

Fig. 5D1

```
</n1:OS>
<n1:Datacenter rdf:about="http://n1.sun.com/example1#datacenter1">
<n1:hasMachine>
<n1:Machine rdf:about="http://n1.sun.com/example1#Server1">
<n1:hardwareType>Sun 4U</n1:hardwareType>
<n1:installed_os>
<n1:OS rdf:about="http://n1.sun.com/example1#Solaris9">
<rdfs:subClassOf rdf:resource="http://n1.sun.com/example1#Solaris" />
</n1:OS>
</n1:installed_os>
</n1:Machine>
</n1:hasMachine>
<n1:hasMachine>
<n1:Machine rdf:about="http://n1.sun.com/example1#Server2">
<n1:hardwareType>Sun Fire V20z</n1:hardwareType>
<n1:installed_os>
<n1:OS rdf:about="http://n1.sun.com/example1#Linux">
<rdfs:subClassOf rdf:resource="http://n1.sun.com/example1#Unix" />
</n1:OS>
</n1:installed_os>
<n1:dns_server rdf:resource="http://n1.sun.com/example1#Server1" />
</n1:Machine>
</n1:hasMachine>
</n1:Datacenter>
<rdf:Description rdf:about="http://n1.sun.com/#dns_server">
<rdfs:comment>The DNS server the machine uses.</rdfs:comment>
</rdf:Description>
</rdf:RDF>
```

*Fig. 5D2*

CONCURRENT A-BOX AND T-BOX GENERATION FOR USE IN WEB ONTOLOGY LANGUAGE (OWL) DATABASE AND KNOWLEDGE BASE CONSTRUCTION

BACKGROUND

Conventional approaches to generating input to a reasoning system typically involve the use of an editing tool to manually create categories (the t-box) and then use ad hoc tools to convert input data into a form that matches these categories (the a-box). Another approach takes an existing vocabulary for a knowledge base and formats data according to rules to form the knowledge base. In many cases, however, there may not be an existing vocabulary. In other cases, the addition of new data may extend the set of categories and their relationships (the t-box). For example, categories may be added by the incorporation of a new piece of data. This typically cannot be handled by ad hoc tools.

Previous approaches have several problems. First, creation of the t-box is difficult. Second, generating a-box data from the input data in a manner that is consistent with the t-box is error-prone. Third, any changes to the t-box will require modification to the tools that generate the a-box. Fourth, it is difficult to dynamically add information to the t-box.

To summarize, in many computer implementations, it is desirable to be able to perform automated reasoning on information expressed in a structured form in a computing environment. Conventional approaches to knowledge based systems typically employ manual or ad hoc tools for creating rules and entering data, which are time consuming and error prone.

SUMMARY

In accordance with one embodiment of the present invention, there are provided methods and mechanisms for implementing concurrent generation of an a-box and a t-box for use in a computing environment comprising a knowledge system. A t-box comprises categories and relationships about the categories. An a-box comprises assertions of individual instances of the categories of the t-box. With these methods and mechanisms, it is possible to process structured information to form a knowledge base for use with a knowledge engine.

In one embodiment, a set of rules and a first set of input information are received. The rules specify actions to be taken in response to finding specific types of input information and a format of an output t-box. The input information is in a format that satisfies the rules. The input information has sufficient structure to enable rules to be applied to the input information to determine individual fields. A t-box, comprising categories and relationships about the categories, and an a-box, comprising assertions of individual instances of the categories of the t-box are generated from the first set of input information and the set of rules. The t-box and the a-box are generated substantially concurrently.

In one embodiment, generating the t-box and the a-box includes reading the set of rules. A portion of t-box information is generated from a portion of the set of rules. The input information is read and parsed to form an internal representation. The internal representation may be a Document Object Model ("DOM") tree or a Simple API for XML ("SAX") event, for example. The internal representation is analyzed against at least one rule of the set of rules to generate a result. The result includes at least one of: an instance, a property instance and a t-box statement. In one embodiment, the result is output to a process that creates knowledge base statements using a standardized format, such as Web Ontology Language ("OWL") for example.

The methods and mechanisms provided by embodiments of the invention can enable concurrent generation of an a-box and a t-box for use in a computing environment comprising a knowledge system. This ability to concurrently generate an a-box and a t-box for use with a knowledge system without incurring expense and overhead of a manual process for verifying the compatibility of the a-box and a t-box makes it possible to attain improved efficiency from computing resources that are used in a knowledge system computing environment.

BRIEF DESCRIPTION OF THE DRAWINGS

FIGS. 5A-5D are diagrams illustrating a description of an example input data, rules and output data for an example knowledge system in one embodiment of the present invention.

DETAILED DESCRIPTION OF EMBODIMENT(S)

Conceptual Overview

Certain data processing tasks involve reasoning about a set of data to determine conclusions. Research in artificial intelligence has yielded various techniques for performing reasoning. One area of research is Description Logics. A Description Logic is a formalism for Knowledge Representation that comprises two parts. The first component defines the concepts or terminology under discussion, and is known as the t-box. The second component describes individual objects using these concepts, and is known as the a-box. Reasoning can be performed on the concepts and individual objects using a variety of methods and mechanisms.

As an example, a t-box could define concepts such as "Person", "Male", and "Female". Rules could be associated with these concepts, for example "A Male is a Person", "A Female is a Person", and "A Person is either Male or Female". Reasoning can be done on these concepts. For example, "Is the category Female the same as the category of Persons who are not Male?"

The t-box can also hold properties, which describe relationships between concepts. For example, "has-as-child" is a property between a "Person" and another "Person". Concepts and rules can be associated with properties. For example, a "Father" can be defined as a "Male" with the "has-as-child" property to one or more Persons.

The second component of a Description Logic is the a-box, which describes individual objects, rather than categories. For example, "The individual John is a member of the category Father". A reasoning system can then determine conclusions based on the t-box and a-box. For example, it could conclude that "John is a member of the category Male", "John is not a member of the category Female", and "There exists at least one Person to which John is connected by the has-as-child property." The above examples have been abbreviated to provide clarity. A more detailed example will be provided below to describe one embodiment that enables reasoning to be used to solve problems in a computer data center.

Figure 4A:
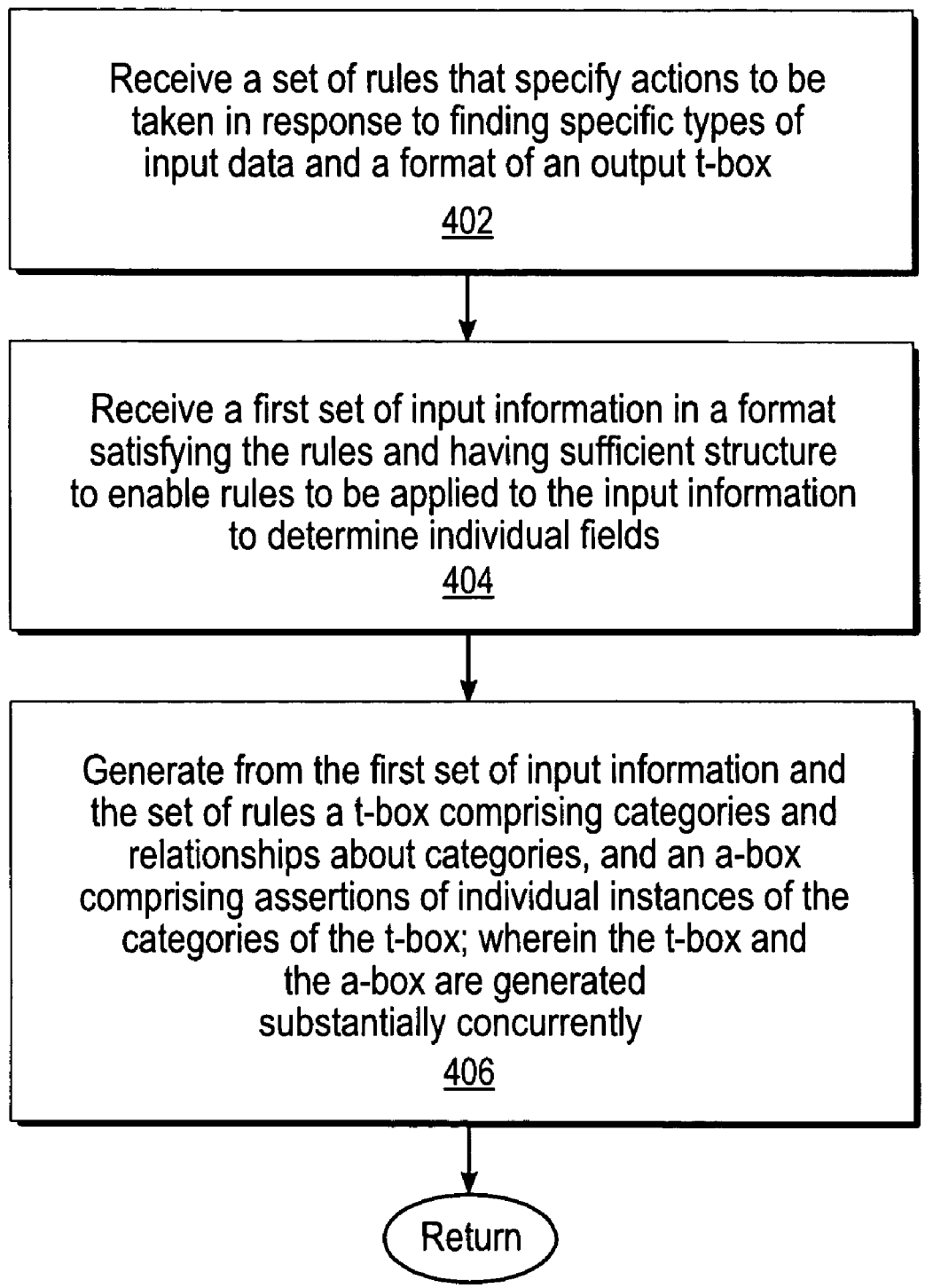
FIGS. 4A-4C are operational flow diagrams illustrating the operation of one embodiment of the present invention.

In accordance with one embodiment of the present invention, there is provided a mechanism for implementing concurrent generation of an a-box and a t-box for use in a computing environment comprising a knowledge system. With this mechanism, it is possible to process structured information using a knowledge engine. A t-box comprises terminology of categories and relationships about the categories. An a-box comprises assertions of individual instances of the categories of the t-box. Together, a t-box and a corresponding a-box comprise a knowledge base, which may be processed by a knowledge engine. In one embodiment, a t-box and a corresponding a-box may be created concurrently based upon input information and configuration rules that define the format of the output t-box and the a-box, and specify actions to perform on the input information. An operational flow diagram, which provides a high level overview of one embodiment of the present invention, is shown in FIG. 4A.

In one embodiment, a set of rules is received (block 402). The rules specify actions to be taken in response to finding specific types of input data and a format of an output t-box. A first set of input information is received (block 404). The input information is in a format that satisfies the rules. The input information has sufficient structure to enable the rules to be applied to the input information to determine individual fields. A t-box, comprising categories and relationships about the categories, and an a-box, comprising assertions of individual instances of the categories of the t-box are generated (block 406) from the first set of input information and the set of rules. The t-box and the a-box are generated substantially concurrently. An initial t-box can be generated from the set of rules. Additional t-box entries and the a-box entries are generated from the input information.

In one embodiment, the method further includes receiving a second set of input information. The second set of input information differs from the first set of input information. A revised t-box and a revised a-box are generated based upon the second set of input information and the set of rules. The revised t-box includes at least one category or relationship not present in the t-box and correlating to data in the revised a-box.

In one embodiment, generating a t-box comprising categories and relationships about categories and an a-box comprising assertions of individual instances of the categories of the t-box substantially concurrently includes reading the set of rules. A portion of t-box information is generated from a portion of the set of rules. The input information is read and parsed to form an internal representation. The internal representation is analyzed against at least one rule of the set of rules to generate a result. The result includes at least one of: an instance, a property instance and a t-box statement. The result is output.

In one embodiment, analyzing the internal representation includes one or more of walking a Document Object Model ("DOM") tree, processing a Simple API for XML ("SAX") event and other data formats are contemplated.

In one embodiment, the first set of input information includes statements in a markup language. In one embodiment, the set of rules includes instructions for processing tags of a markup language. In one embodiment, receiving a first set of input information includes reading the first set of input information from a database, a LISP data structure and other data formats are contemplated.

In one embodiment, the result is provided to a process that writes a Web Ontology Language ("OWL") statement. Description Logics provide a mechanism for reasoning about complex categories of data. However, the data is provided to the reasoning system in a specific format that the reasoning system understands. Many reasoning systems have standardized on a representation called Web Ontology Language, usually referred to by the permuted acronym OWL. The official standard for this representation is available at http://www.w3.org/2001/sw/WebOnt/. Other standards including RDF, RDFS, and XML standards and other data formats are contemplated.

In other aspects, the invention encompasses in some embodiments, computer apparatus, computing systems and machine-readable media configured to carry out the foregoing methods.

The methods and mechanisms provided by embodiments of the invention can enable concurrent generation of an a-box and a t-box for use in a computing environment comprising a knowledge system. This ability to concurrently generate an a-box and a t-box for use with a knowledge system without incurring expense and overhead of a manual process for verifying the compatibility of the a-box and a t-box makes it possible to attain improved efficiency from computing resources that are used in a knowledge system computing environment.

System Overview

Figure 1A:
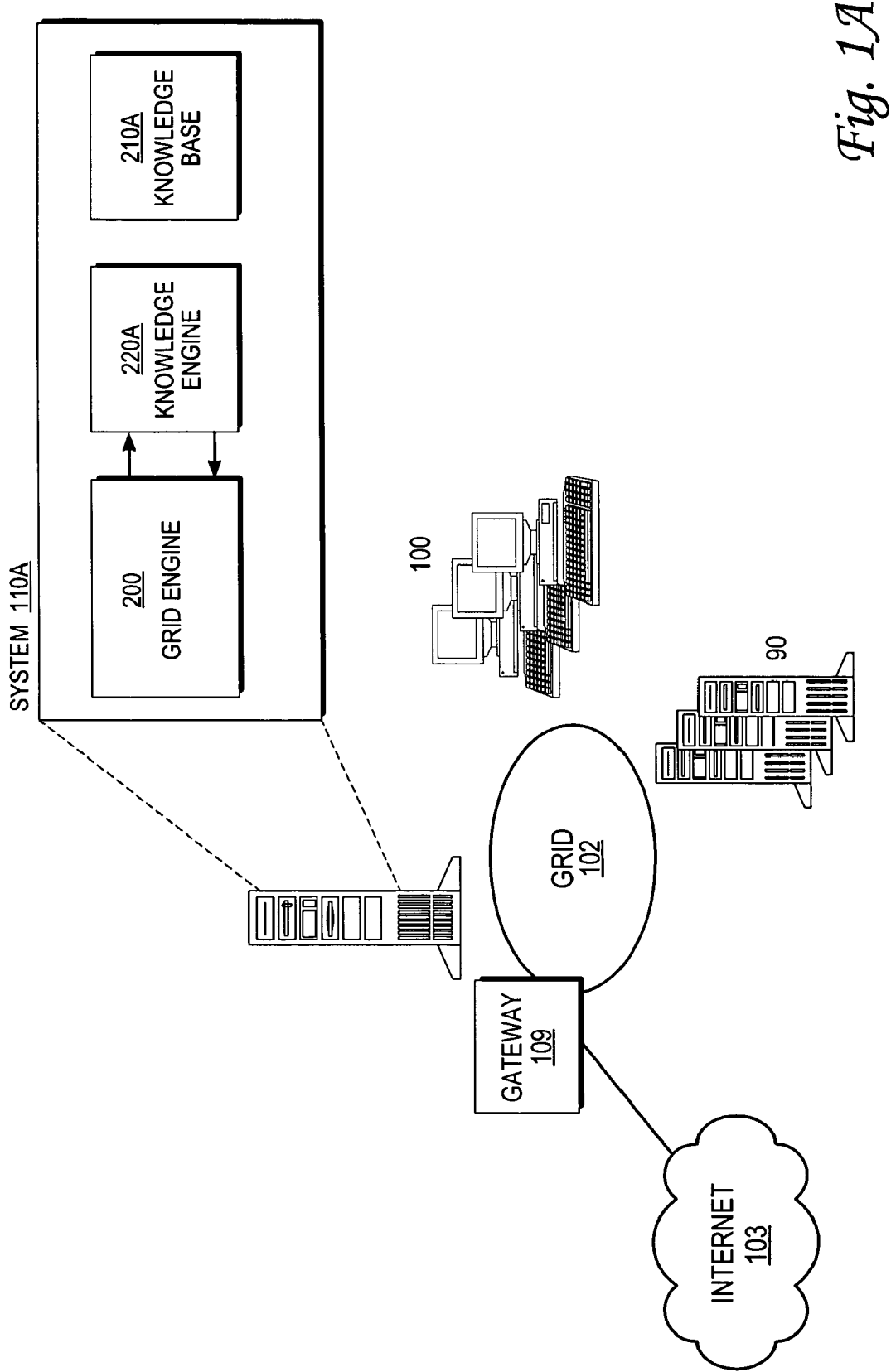
FIGS. 1A-1C are functional block diagrams of example computing environments in which one embodiment of the present invention may be implemented.

FIG. 1A is a functional block diagram of an example grid computing environment in which creating a knowledge base in one embodiment of the present invention may be implemented. While the present embodiment is illustrated with reference to an example embodiment using a grid computing environment, a grid is not required to implement other embodiments. For example, in some embodiments, techniques according to the invention may be implemented in knowledge systems operable on stand-alone computer systems, network centric computing systems, e-commerce applications, computing systems acting as service processors for other computing systems and computing systems with other configurations are contemplated.

An example embodiment will be described in further detail with reference to an example implementation demonstrating how reasoning can be used to solve problems in a computer data center. A data center typically comprises multiple hardware instances running multiple types of software. A description of the data center can help solve tasks through a reasoning system. For example, a task may be to find a computer that can run a software package X. This package will have certain requirements associated with it; for example, it only runs on a Unix-compatible machine. If there is a machine Y running Solaris 9, is this machine compatible? A set of rules can help solve this problem: "Solaris 9 is a type of Solaris", "Solaris is a type of Unix". Given these general rules, and the information about software package X and machine Y, a system can conclude that X and Y are compatible.

While ad hoc solutions can be developed to solve these problems given a set of data that describes the situation, development of ad hoc based systems becomes more and more complex and error-prone as the reasoning tasks become more complex. A reasonable alternative is to use a general-purpose reasoning system that can solve these tasks. This system can be based on Description Logics.

As shown in FIG. 1A, an example grid computing environment in which one embodiment of the present invention may be implemented includes a computing grid 102. Computing grid 102 comprises a variety of interconnected computing resources, including computing resources 90 and 100 managed by system 110A, which acts as a resource manager for the grid. Optionally, a gateway 109, which can be a modem, router, local area network (LAN) connection, wide area network (WAN) connection, or other device or devices that provides connectivity can provide connectivity with Internet 103 or other publicly accessible networks. In various embodiments, system 110A and computing resources 90 and 100, may be connected by any one or more other variety of connections including networks, both public or private, wire-less or wired communications links, Virtual LAN (VLAN) based networks, shared memory interconnections, optical interconnections and other mechanisms and methods providing connectivity are contemplated.

System 110A includes a number of components that enable system 110A to act as a resource manager for the grid. For example, system 110A includes grid engine 200, which controls workflow and client requests into the resources 90, 100 of the grid 102, as well as, results and responses from applications deployed on the resources 90, 100 of the grid 102.

Computing resources 90 and 100 include any number and variety of computing resources. As shown in FIG. 1A, computing resources 90 can include hardware upon which one or more operating systems and one or more applications may be deployed. Multiple applications may execute on separate nodes of grid 102. The applications may function together to provide one or more services. Services can include without limitation, financial transactions, i.e., banking, equity and commodity trading; merchandise sales, i.e., book sales clothing sales; consumer and business services, i.e., travel agency, equipment rental; an internet service provider (ISP) and other services implemented upon a computer are contemplated. For example an ISP may include various services components, such as without limitation routers, switches, servers and other hardware and software that provide infrastructure to the ISP services. The example services include without limitation DSL provisioning, frame relay circuits, web hosting, mail hosting and communication infrastructure provisioning and related services, as well as computing and data resource infrastructure and related services.

As shown by FIG. 1A, system 110A may include a knowledge base 210A, a knowledge engine 220A that enable grid engine 200 to manage information about the types and configurations of computing resources 90, 100 in the grid 102, and to use the information to allocated work and requests from customers to applications within the grid 102, and to deploy additional instances of applications on resources 90, 100 in the grid 102 in order to meet requests. For example, grid engine 200 of system 110A may receive a request from a user for one or more resources in the grid to perform a task. Grid engine 200 formulates a query whether grid 102 includes resources to perform the task and submits the query to knowledge engine 220A. Knowledge engine 220A consults knowledge base 210A in order to determine whether resources existing in the grid 102 are capable of handling the request. Knowledge engine 220A provides the grid engine 200 a determination of whether resources 90, 100 of grid 102 are able to service the task. In this embodiment, system 110A can act in the role of resource manager for grid 102.

Figure 1B:
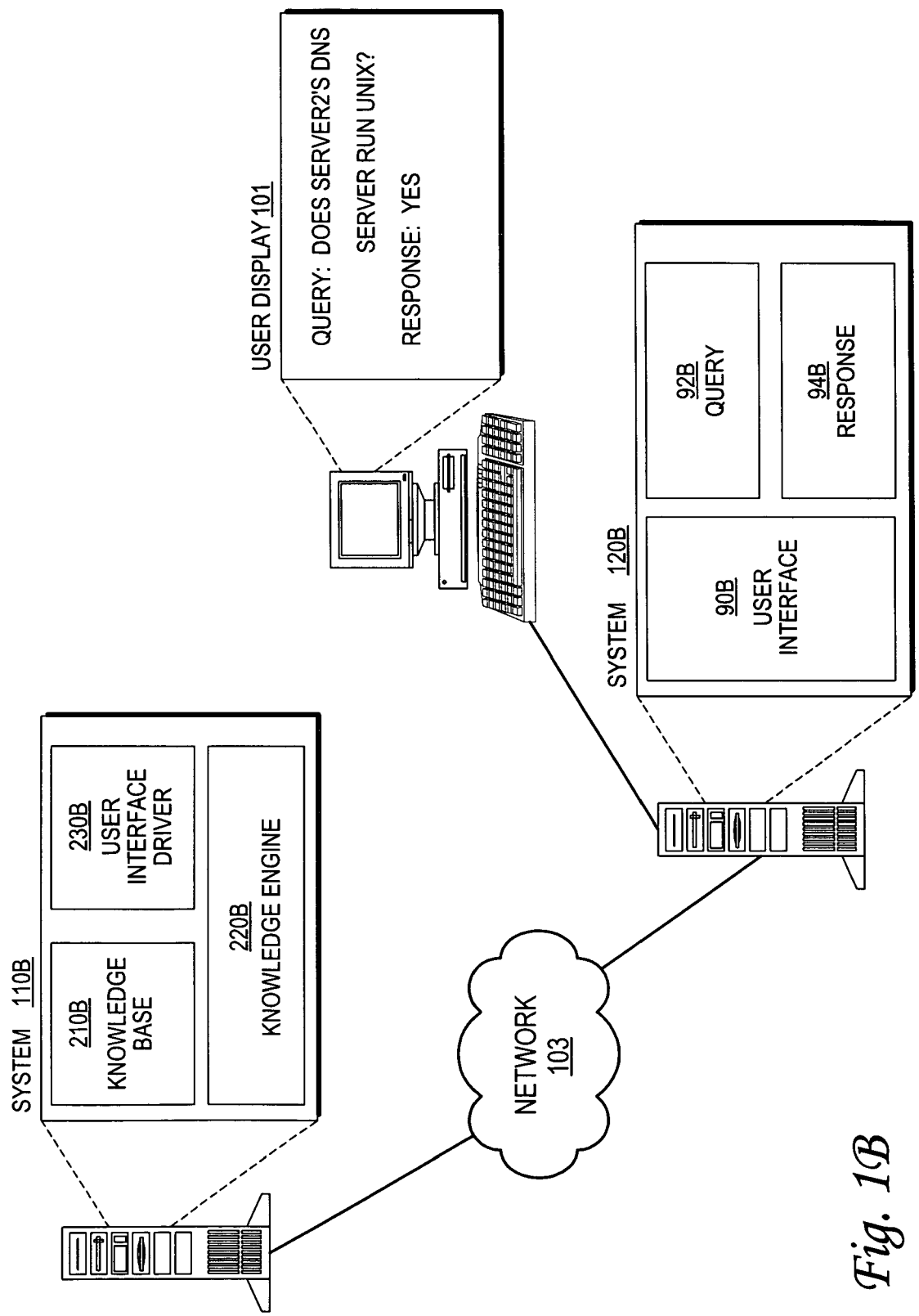

FIG. 1B illustrates an alternative embodiment implemented in a client server configuration in which a system 10B is connected to a network 103, which provides connectivity to a second system 120B. In the configuration depicted by FIG. 1B, system 110B and system 120B function in the roles of server and client, respectively. A user uses system 120B to obtain services from the server 110B using a user display 101, which may be a display, terminal or other input/output device. System 110B and system 120B may be any kind of computer or programmable device, such as without limitation personal data assistants (PDAs), gateways, routers, microcontrollers, wireless communications devices, such as cellular phones, wireless telephones, wireless radio transceivers and other programmable devices are contemplated, but in the example embodiment illustrated by FIG. 1B, system 110B and system 120B are general-purpose computers. Network 103 may be any type of network, including without limitation, public or private, wire-less or wired, direct communications links, Virtual LAN (VLAN) based networks, shared memory interconnections, optical interconnections and other mechanisms and methods providing connectivity are contemplated, however in one embodiment, network 103 comprises a packet network.

In the embodiment illustrated by FIG. 1B, system 110B includes one or more components that perform processing to enable users to obtain access to, and work with, stored knowledge. In the example embodiment depicted by FIG. 1B, system 110B includes a knowledge base 210B, a knowledge engine 220B and a user interface driver 230B. As further illustrated by FIG. 1B, system 110B includes a user interface 90B, which may be a browser program for retrieving web pages from user interface driver 230B or the like. The user interface 90B provides a mechanism for the user to input queries 92B and receive responses 94B based upon the knowledge stored in the knowledge base 210B and reasoning capabilities of knowledge engine 220B. For example, system 120B may receive a request from a user connected via user display 101 for information about computing resources in a data center. In the embodiment illustrated by FIG. 1B, the user has inquired whether server 2's DNS server runs UNIX. User interface 90B receives the query 92B and sends the query via network 103 to knowledge engine 220B of system 110B. Knowledge engine 220B consults knowledge base 210B in order to determine whether server 2's DNS server runs UNIX. Knowledge engine 220B reasons using the knowledge in the knowledge base 210B and provides the answer to system 120B. In this embodiment, system 110B can act in the role of a knowledge processor.

Figure 1C:
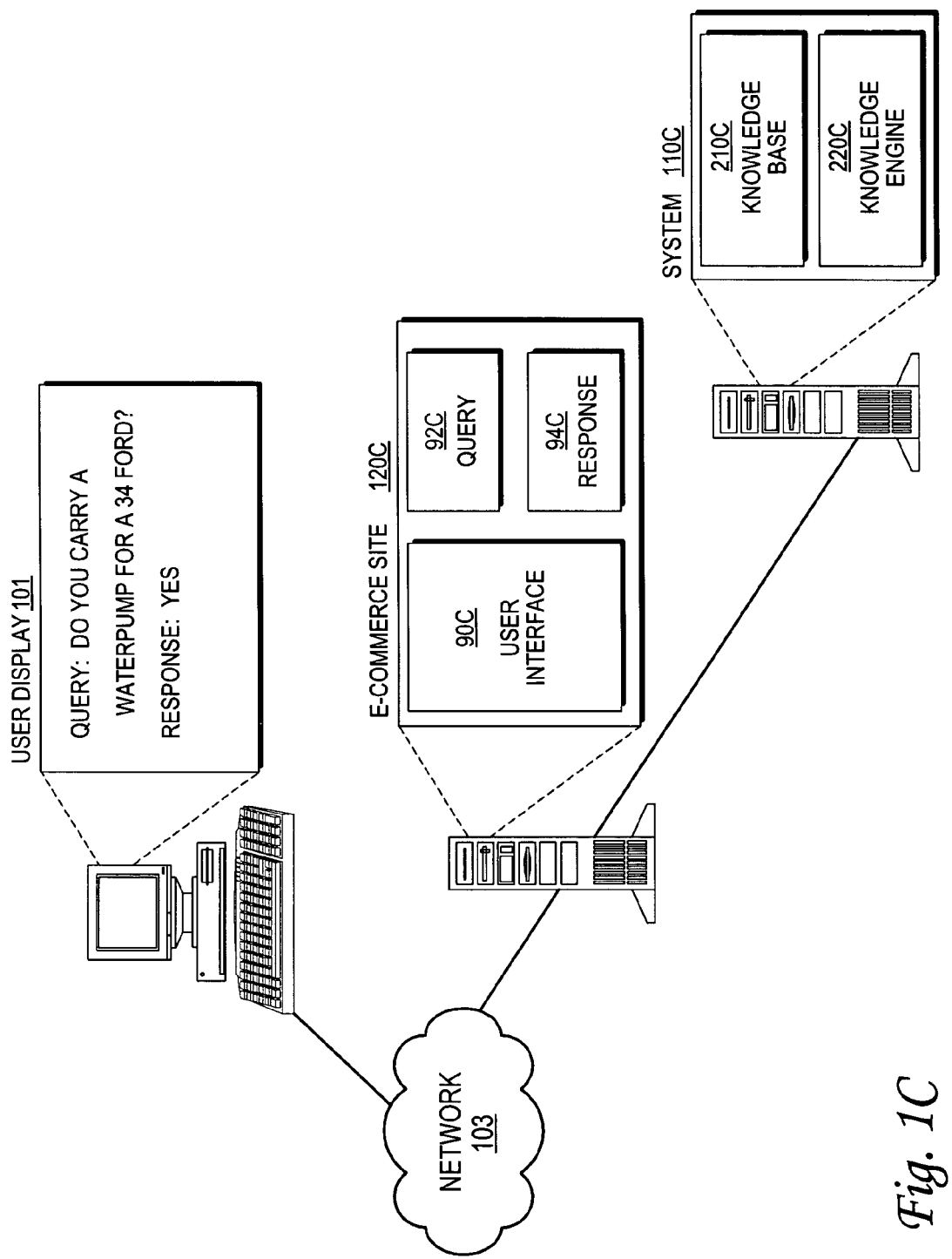

FIG. 1C illustrates another alternative embodiment implemented in a networked e-commerce configuration in which a user interacts with system 120C via a user display 101 connected via network 103 in order to purchase or lease goods or services. In the configuration depicted by FIG. 1C, system 120C implements an e-commerce site. Network 103 may be any type of network or combination of networks, including the Internet. System 120C includes a user interface 90C, which receives at least one query 92C from user display 101 and displays at least one response 94C on the user display 101. System 120C is connected to a system 110C which, in the illustrated embodiment, implements a knowledge system. System 120C processes user queries and submits the user queries to system 110C. System 110C includes a knowledge engine 220C that uses knowledge information stored in a knowledge base 210C in order to respond to the queries. In the embodiment illustrated by FIG. 1C, the user has inquired whether e-commerce site 120C sells a particular part for a particular year and model car. While conventional solutions to such problems of inventory management exist, these conventional systems require that the knowledge of individual models part numbers and years be incorporated into the application. This can lead conventional systems to become unwieldy in circumstances such as where multiple OEM manufacturers provide parts having various numbering systems for particular model automobiles, for example. Accordingly, in the embodiment illustrated by FIG. 1C, the knowledge of various serial numbers, manufacturers, makes, models and years can be incorporated into knowledge base 210C. Changes to this information can be reflected automatically in the knowledge base 210 using mechanisms and methods provided by one more of the embodiments described herein.

In another embodiment, the problem of determining software patch compatibility is addressed using a knowledge base. To fix bugs and add features in software, software typically has patches. Complex dependencies typically occur between patches. For example, patch A is the newer version of patch B and fixes everything B fixes. Use of patch C also requires patch D. Patch E does not work in combination with patch F. Patches G and H are now obsolete and have been combined into patch I. Many questions can be raised about a set of patches. For example, given a list of patches on a machine, are all the dependencies satisfied? If a patch is added to a machine, what other patches need to be added? If a software package requires a particular fix, will it run with the current set of patches on a machine, or are additional patches required? Can two software packages run on the same machine, or is there no way to satisfy the patch requirements of both? In one example embodiment, the knowledge about each patch and combinations of patches is incorporated into a knowledge base from which a knowledge engine can extract and use the knowledge to answer such queries.

In a yet further embodiment, knowledge processing mechanisms and methods described herein may be implemented with a service processor computer in order to enable the service processor to make configuration and resource allocation decisions using the knowledge system. A service processor is a computer that allocates computing system resources to various tasks. Other applications and implementations are contemplated.

Figure 2:
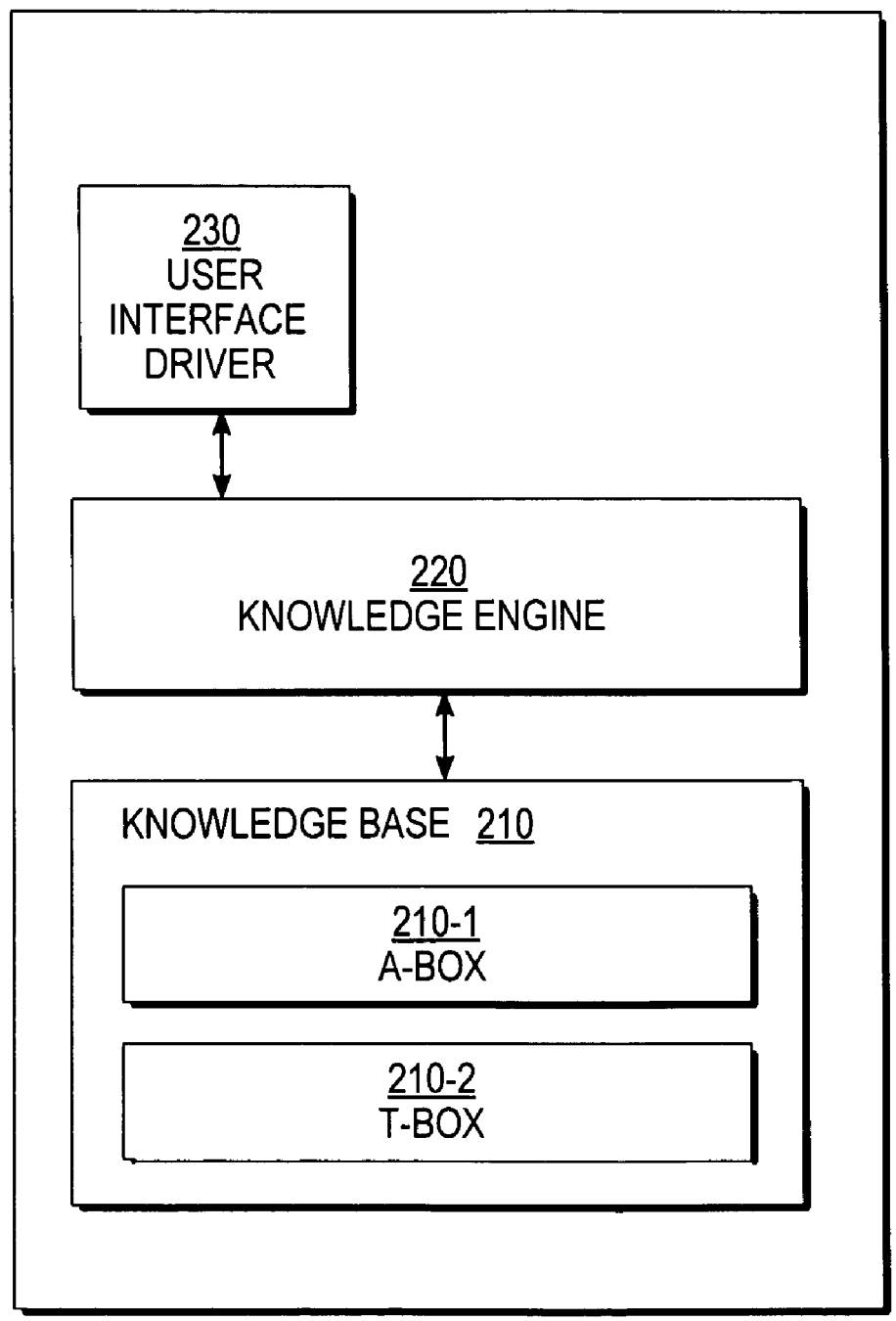
FIG. 2 is functional block diagram of an example knowledge system in the computing environments of FIGS. 1A-1C in various embodiments of the present invention.

With reference to FIG. 2, system 110 includes a knowledge base 210, a knowledge engine 220 and a user interface driver 230. An optional user interface driver 230 provides an interface to the user to receive queries from the user via user display 101 and provide responses on the user display 101 in embodiments that respond to queries from users. User interface driver 230 may be, without limitation, a web server, graphical user interface and other types of interfaces for computers are contemplated. In embodiments where the queries are formulated to obtain information for an automated resource manager, service processor or other automated computing resource, user interface driver may be replaced with an interface configured to the particular automated computing resource submitting the query. Knowledge engine 220 includes executable code that performs processing on the knowledge stored in the knowledge base 210 to enable the user to obtain responses to queries made of the knowledge system 110. Knowledge base 210 is comprised of a plurality of components. Specifically, the knowledge base 210 includes an a-box 210-1 and a t-box 210-2. The t-box 210-2 comprises a vocabulary or terminology of categories and relationships between the categories. For example, "Solaris is a subtype of UNIX". The a-box 210-1 comprises individual instances of the categories of the t-box. For example, "Server1 is running Solaris."

Figure 3:
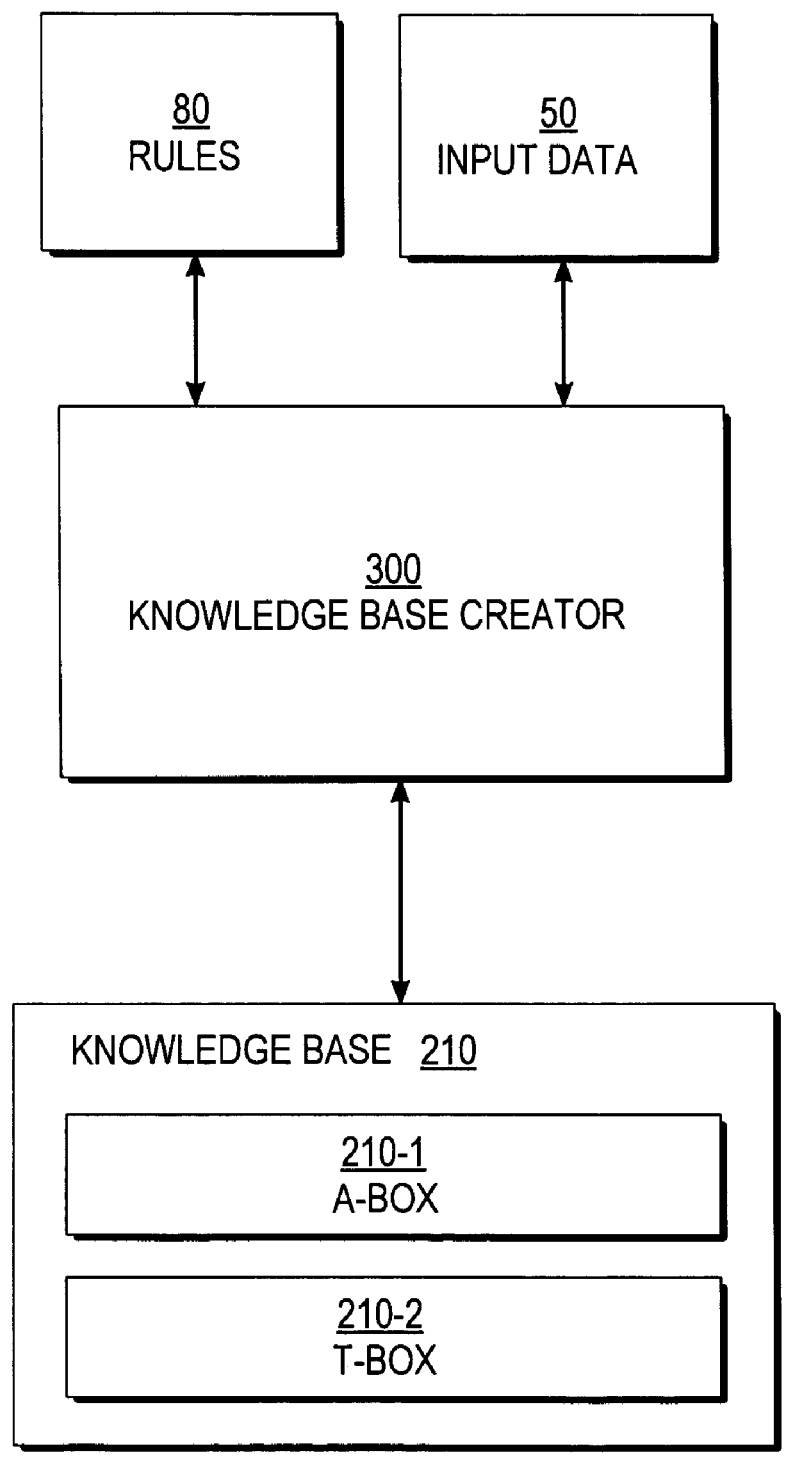
FIG. 3 is functional block diagram of an example knowledge base creator in one embodiment of the present invention.

With reference to FIG. 3, a block diagram is provided that illustrates an example knowledge base creator in accordance with one embodiment of the present invention. As depicted in FIG. 3, a knowledge base creator 300 receives input of rules 80 and input data 50. The knowledge base creator 300 may be implemented in a variety of ways, such as, for example, software executed by a computer, which may be a computer functioning as a resource manager controlling a resource layer comprising a plurality of computing resources and devices in a grid, a service processor computer controlling the allocation of resources in another computing system, a stand alone or networked knowledge workstation, or personal or desktop system, or as logic that is hard coded into a device such as without limitation an application specific integrated circuit (ASIC) and other implementations are contemplated.

The input data 50 includes information to be stored in the knowledge base 210. In one embodiment, the input data 50 is specified with a mechanism that provides structural queues to the receiver of the input data, an example of which is a markup language, such as without limitation eXtended Markup Language (XML) for example, however, in alternative embodiments, input data 50 may be formatted to a database schema, a LISP or LISP-like data structure, or other mechanism for providing structure to the input data are contemplated.

The rules 80 include instructions to the knowledge base creator 300 to enable the knowledge base creator 300 to process the input data 50 to produce the knowledge base 210. In one embodiment, the rules 80 are specified with a mechanism that provides structural queues to the receiver of the rules 80, an example of which is a markup language, such as without limitation eXtended Markup Language (XML) for example, however, in alternative embodiments, rules 80 may be formatted to a database schema, a LISP or LISP-like data structure, or other mechanism for providing structure to the rules are contemplated In one embodiment, the input rules 80 are generated using an interactive tool. In one embodiment, the interactive tool reads in a Document Type Definition (DTD), a well-known way of describing the valid form of an XML document, which describes the XML-based input data 50. In one embodiment, the interactive tool reads in an XML schema that describes the XML-based input data 50. An XML Schema is a well-known way of describing the valid form of an XML document. In one embodiment, the tool uses the DTD or XML schema as a starting point for creating the input rules 80, and the user provides additional information on the processing of the input.

In one embodiment, the input rules 80 are expressed in XML, and are structured analogously to the input data 50 using a plurality of tags. For example, in one embodiment the following tags are used:

<tag name="foo">: This matches the tag "<foo>" in the input data. The rules enclosed in this tag will be activated if the tag matches the input.

<createResource type="resourceType" id="id-description" comment="comment on the resource">: This causes a resource instance of type resourceType to be created. The new resource is given an identification generated by "id-description". The "id-description" will generate the identification from fields in the input data using the well-known Xpath description language. The comment is simply a comment that will be attached to the resource.

<createLiteralResource type="type" value="pattern">: This causes a literal (e.g. string) of the specified type to be created. The contents are specified by the Xpath pattern, which can access the contents of a tag or attribute.

<createPropertyLink property="property-name" toResource="current or parent" or toName="pattern" fromResource="current or parent" or fromName="pattern" comment="comment">: This tag creates a property link between two resources, specified by the "to" and "from" attributes. The resource can be specified as the current (most recently created) resource, or the parent (enclosing) resource, or can be specified by name, to link to an arbitrary resource.

<createSubclass type="resourceType" id="id-description" subclassOf="pattern" comment="comment">: This tag dynamically creates a new class, rather than just a new resource. That is, it modifies the t-box, not the a-box. The "id" specifies the name for the new class, and uses an Xpath-like syntax. The "subclassOf" specifies the class that the new class specializes. An example of a set of rules 80 will be described in further detail below in connection with one example embodiment with reference to FIG. 5C.

The structure of the <tag> and <attribute> tags can be derived from a DTD or XML schema by a tool, allowing the user to then fill in the additional desired tags.

The input language described above is one embodiment of the invention, but it should be clear to one of ordinary skill in the art that many other alternatives exist, both in XML and otherwise. For example, additional information can be specified in the rules to provide more control over the results. In another example, constraints can be specified on the domain and range of links, beyond the constraints that the system can automatically determine. Additional control can be provided over the XML namespaces used; for simplicity, the above discussion omits namespaces, but the application of namespaces is a straightforward task for one of ordinary skill in the art. The "<tag>" tag can be extended to handle recursive tags, that is, when a particular tag can appear multiple times inside a nested sequence of tags. Another embodiment of the input language for the invention is a declarative language, for example one based on well-known XSL transforms (XSLT).

It should be clear to one of ordinary skill in the art that other embodiments of the invention are possible. One such embodiment applies a pre-processing step to the input data 50, to convert it into a form that can be processed more easily by the input rules 80. For example, in one embodiment, data in a format other than XML can be converted to XML. The XML data can be pre-processed into new XML data that is structured closer to the desired final result using well-known XSL transforms (XSLT) for example.

The knowledge base creator 300 generates the knowledge base 210 from the input data 50 in accordance with the rules 80. One aspect of embodiments of the present invention is that the knowledge base creator 300 is capable of creating both the a-box 210-1 and the t-box 210-2 of the knowledge base 210 substantially simultaneously. This feature enables specific embodiments to ensure that the a-box and the t-box are compatible without additional checking. Another benefit that embodiments can provide is that it is not necessary to convert information for an a-box to another format in order to be compatible with the format of a t-box.

One embodiment of the knowledge base creator 300 is as follows. The input rules 80 are read and examined. A t-box 210-2 is generated expressing the resource classes, properties, constraints, and class hierarchy defined by the rules 80. (That is, the part of the ontology that is independent of any specific input data.) Next, the input data 50 is read in, and processed according to the rules 80. This processing stage sequentially parses the input data 50, determines what rule matches the input data, and creates new resource, literals, properties, classes and other constructs that form the a-box 210-1. The new information is combined with the initial t-box 210-2 to form an OWL database 210. This OWL format database is written out in a desired representation, such as, without limitation RDF/XML, RDF/XML-ABBREV, n-triples and other well-known formats for representing the data are contemplated.

Figure 4B:
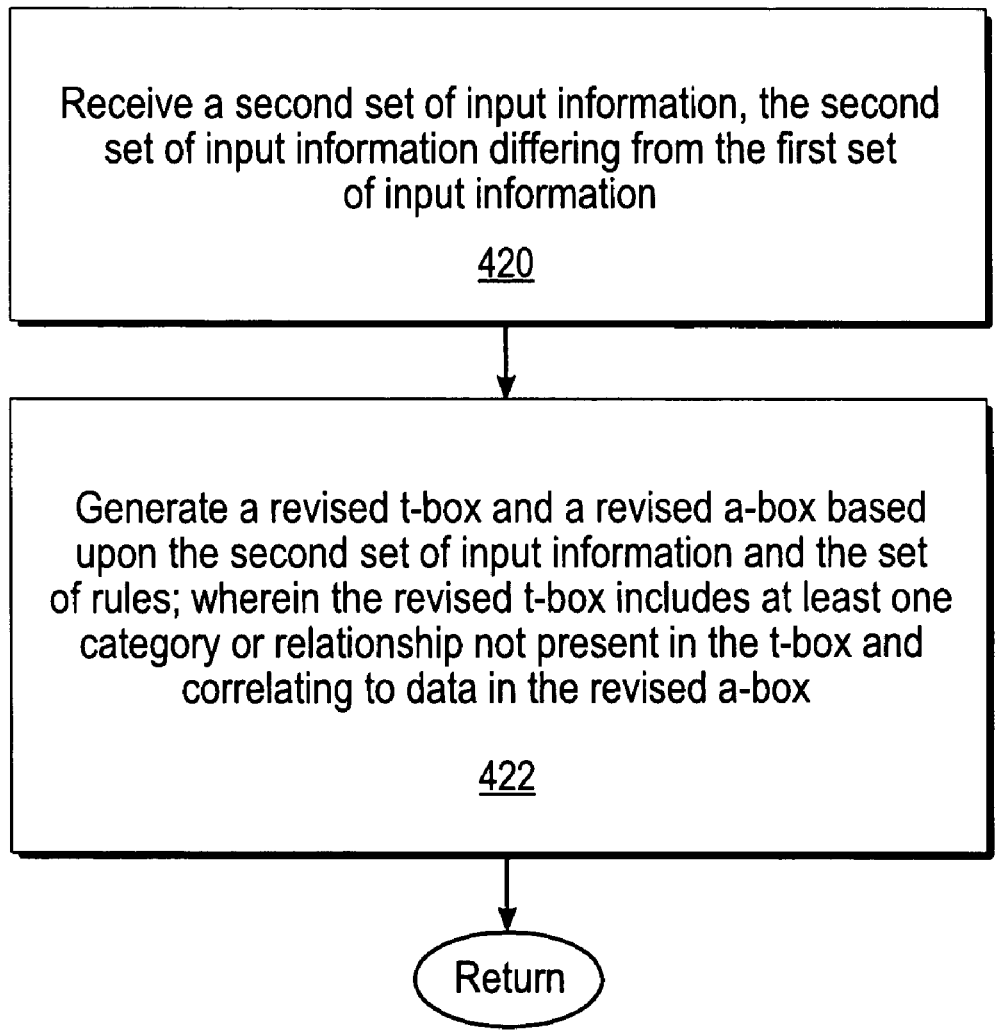

In one embodiment, knowledge base creator 300 can update one or both of the a-box 210-1 and the t-box 210-2 of the knowledge base 210 based upon revisions to the input data 50. Referring to FIG. 4B, an example of a process for generating a revised t-box and corresponding a-box from revised input information is illustrated in one embodiment. In block 420, a second set of input information is received. The second set of input information differs from the first set of input information. In block 422, the revised t-box and revised a-box are generated based upon the second set of input information and the set of rules. The revised t-box will include one or more categories or relationships not present in the t-box and correlating to data in the revised a-box.

Figure 4C:
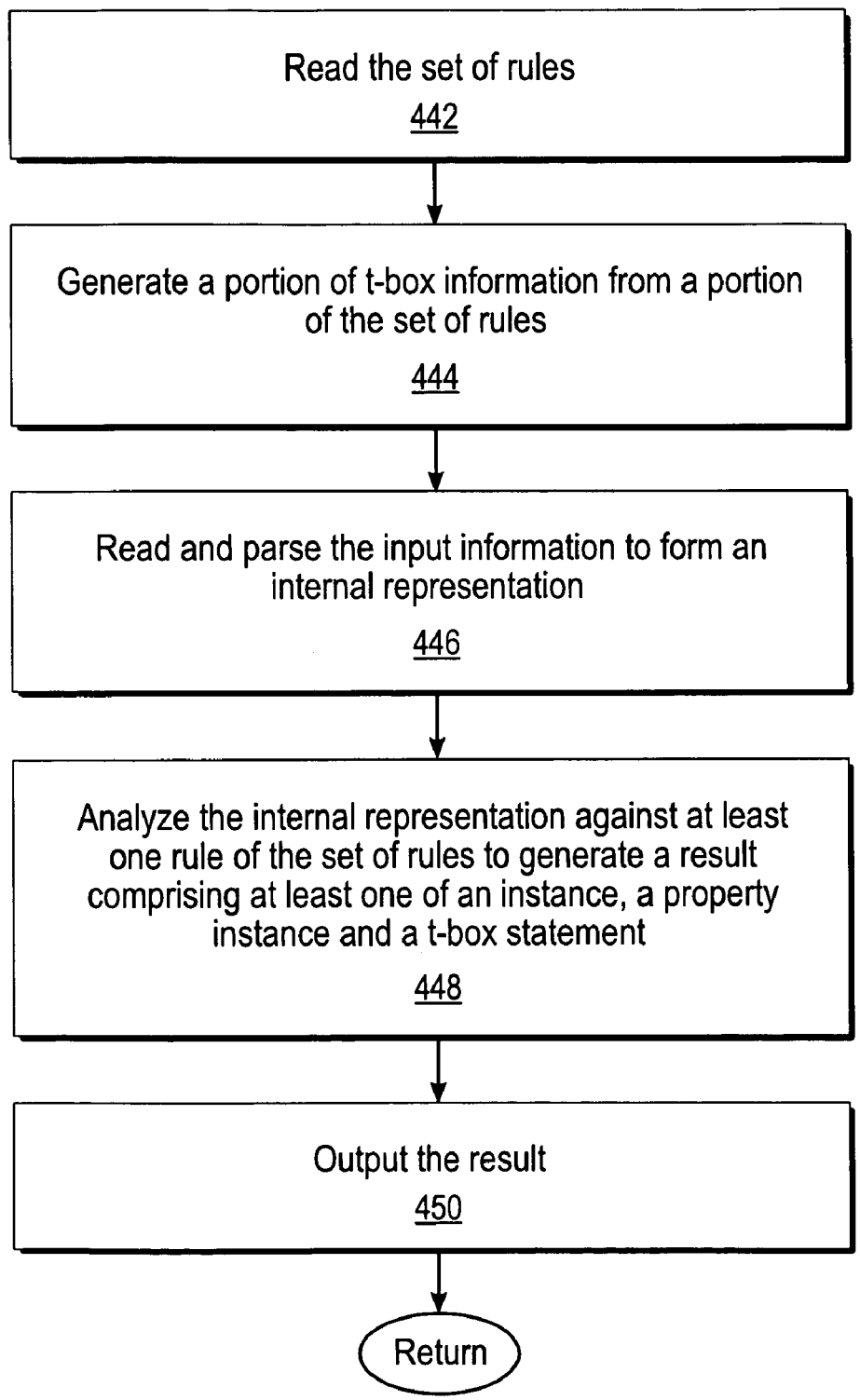

Referring to FIG. 4C, an example of a process for generating a t-box and an a-box from the input information is illustrated in one embodiment. In block 442, the set of rules is read. In block 444, a portion of t-box information is generated from a portion of the set of rules. In block 446, the input information is read and parsed to form an internal representation. In block 448, the internal representation is analyzed against at least one rule of the set of rules to generate a result comprising at least one of an instance, a property instance and a t-box statement. In block 450, the result is output.

Example Operation

An example of creating a knowledge base including a-box and t-box in accordance with one embodiment of the present invention will now be described. In the following discussion, reference will be made to the description of an example input data, rules and output results of FIGS. 5A-5D and example resultant knowledge base 210 of FIG. 6.

FIGS. 5A-5D are diagrams illustrating a description of an example input data, rules and output results for an example knowledge system in one embodiment of the present invention. FIG. 6 is a diagram illustrating an example knowledge system produced in accordance with the example input data, rules and output results in FIGS. 5A-5D in one embodiment of the present invention. The contents of FIGS. 5A-5D and FIG. 6 will be discussed in further detail below with reference to a specific example embodiment that includes processing for generating both a-box 210-1 and t-box 210-2 of knowledge base 210 from mark up language statements.

FIG. 5A illustrates an example set of statements in a markup language that serves as input data in one embodiment. As shown in FIG. 5A, a simple example of a datacenter is represented using eXtended Markup Language (XML). The statements illustrated in FIG. 5A specify some generic facts about four (4) different OS implementations. These statements also specify information about two (2) machines. A first machine, named Server 1 is a Sun 4U running Solaris 9 operating system. The second machine is named Server 2 and is a Sun Fire V20z running the Linux operating system. Server 2 uses Server 1 as a DNS server.

In one embodiment, input data is specified with a mechanism that provides structural cues to the receiver of the input data, an example of which is eXtended Markup Language (XML), however, in alternative embodiments, input data formatted to a database schema, a LISP or LISP-like data structure, or other mechanism for providing structure to the input data are contemplated. In the example depicted in FIG. 5A, the input data 50 includes markup language statements that describe a datacenter. As depicted in FIG. 5A, data center markup language tag DATACENTER 512 and a corresponding /DATACENTER closing tag, delineate definition for the data center. An id field indicates that the datacenter is datacenter1. A MACHINE tag at line 504, and a corresponding /MACHINE closing tag, delineate a definition for a particular machine in the data center. This machine has a number of tags and attributes that indicate information about this particular machine. For example, as indicated by line 504 of FIG. 5A, a "name" attribute and its value, "server1" indicate that the machine's name is "server1." The HARDWARE_TYPE sub-tag 503 and its contents, "SUN4U" indicate that the machine is a SUN 4U. The INSTALLED_OS sub-tag 501 and its contents, "Solaris9" indicates that this machine is running the Solaris9 operating system. Similarly, a second MACHINE tag at line 502, and a corresponding /MACHINE closing tag, delineate a definition for a second machine in the data center. This second machine has a number of tags and attributes that indicate information about this particular machine. For example, as indicated by line 502 of FIG. 5A, a "name" attribute and its value, "server2" indicate that the machine's name is "server2." The HARDWARE_TYPE sub-tag 513 and its contents, "Sun Fire V20z" indicate that the machine is a Sun Fire V20z. The INSTALLED_OS sub-tag 511 and its contents, "Linux" indicates that this machine is running the Linux operating system. A DNS_SERVER tag 515 and its corresponding "server_name" attribute with corresponding value, "server1" indicate that server2's DNS name server is "server1."

Further with reference to FIG. 5A, an OS tag at line 507, and a corresponding /OS closing tag, indicate a definition for the UNIX operating system. Similarly, a second OS tag at line 506, and a corresponding /OS closing tag, indicate that information about the Solaris9 operating system is to be provided. Specifically, line 506, an "implements" attribute indicates that Solaris9 implements a form of the Solaris operating system. Similarly, a third OS tag at line 508, and a corresponding /OS closing tag, indicate that information about the Solaris operating system is to be provided. Specifically, in-line 508, an "implements" attribute, and its value, "Unix" indicates that the Solaris operating system implements a form of the UNIX operating system. A fourth OS tag at line 510, and a corresponding /OS closing tag, indicate that information about the Linux operating system is to be provided. Specifically in line 510, an "implements" attribute, and its value, "Unix" indicates that the Linux operating system implements a form of the UNIX operating system.

With the information provided by FIG. 5A, knowledge based system can answer questions such as "What machines are running a version of Solaris?" or "If a software package requires Linux, will it run on Server1?" or "Are there any Sun 4U machines running Unix?" Conventionally, to answer these questions based upon the example shown in FIG. 5A would require special purpose coding. By translating the example shown in FIG. 5A into a form usable by a knowledge engine using the mechanisms and methods provided by various embodiments, these queries can be processed using standard knowledge engines and standard query languages.

While the types of queries that may be made using the example information shown in FIG. 5A may appear rudimentary, those of ordinary skill in the art will appreciate that more detailed examples of a datacenter description could include information such as locations (forming a hierarchy), software packages, patches, hardware and software requirements for software, other types of hardware such as storage, switches, and routers, hierarchies of hardware, wiring between components and other computational resources are contemplated. This would allow queries such as "What systems at the Mountain View site could potentially run Software X, and what patches will these systems require?" to be answered using knowledge driven systems.

Figure 5B:
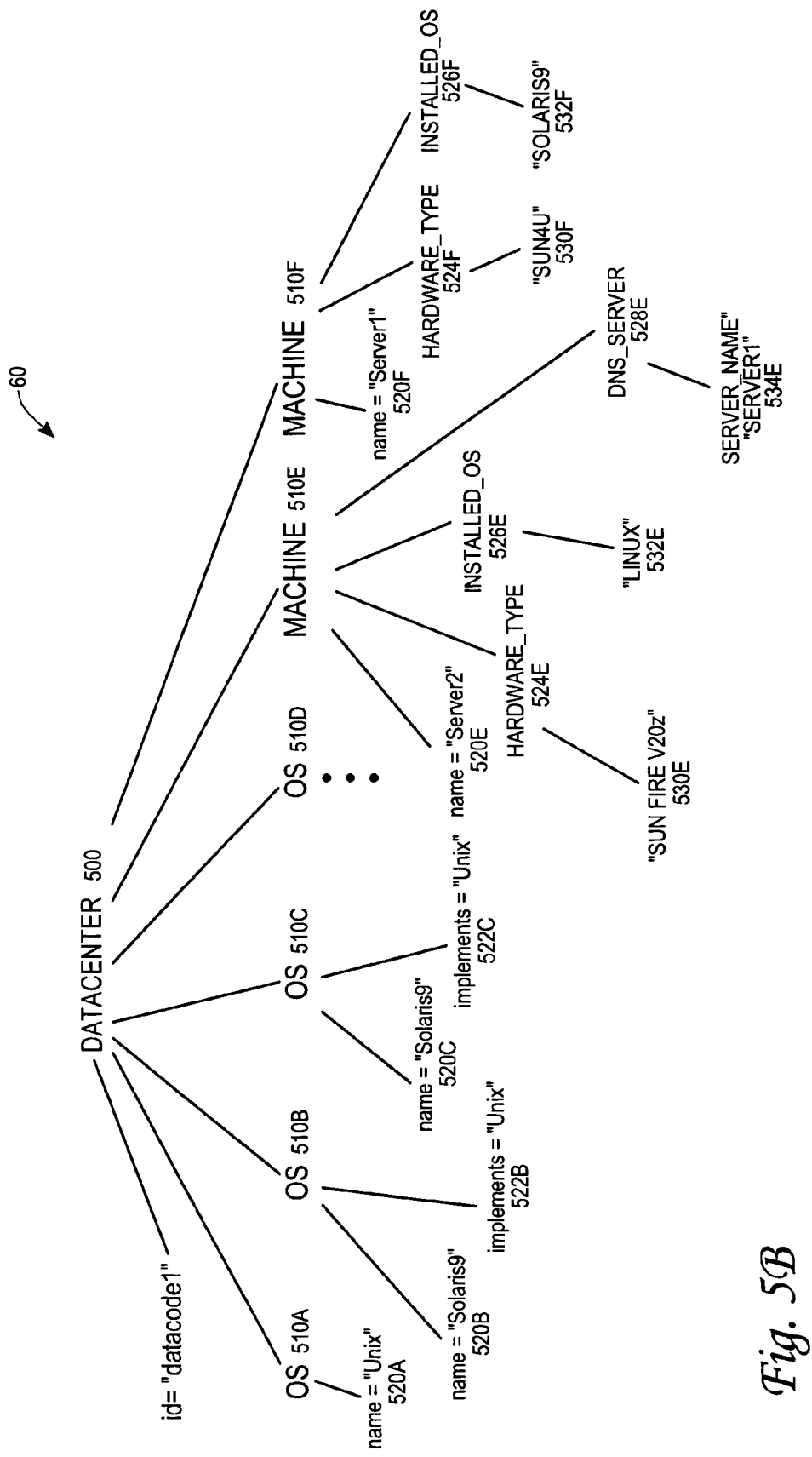
Figure 6:
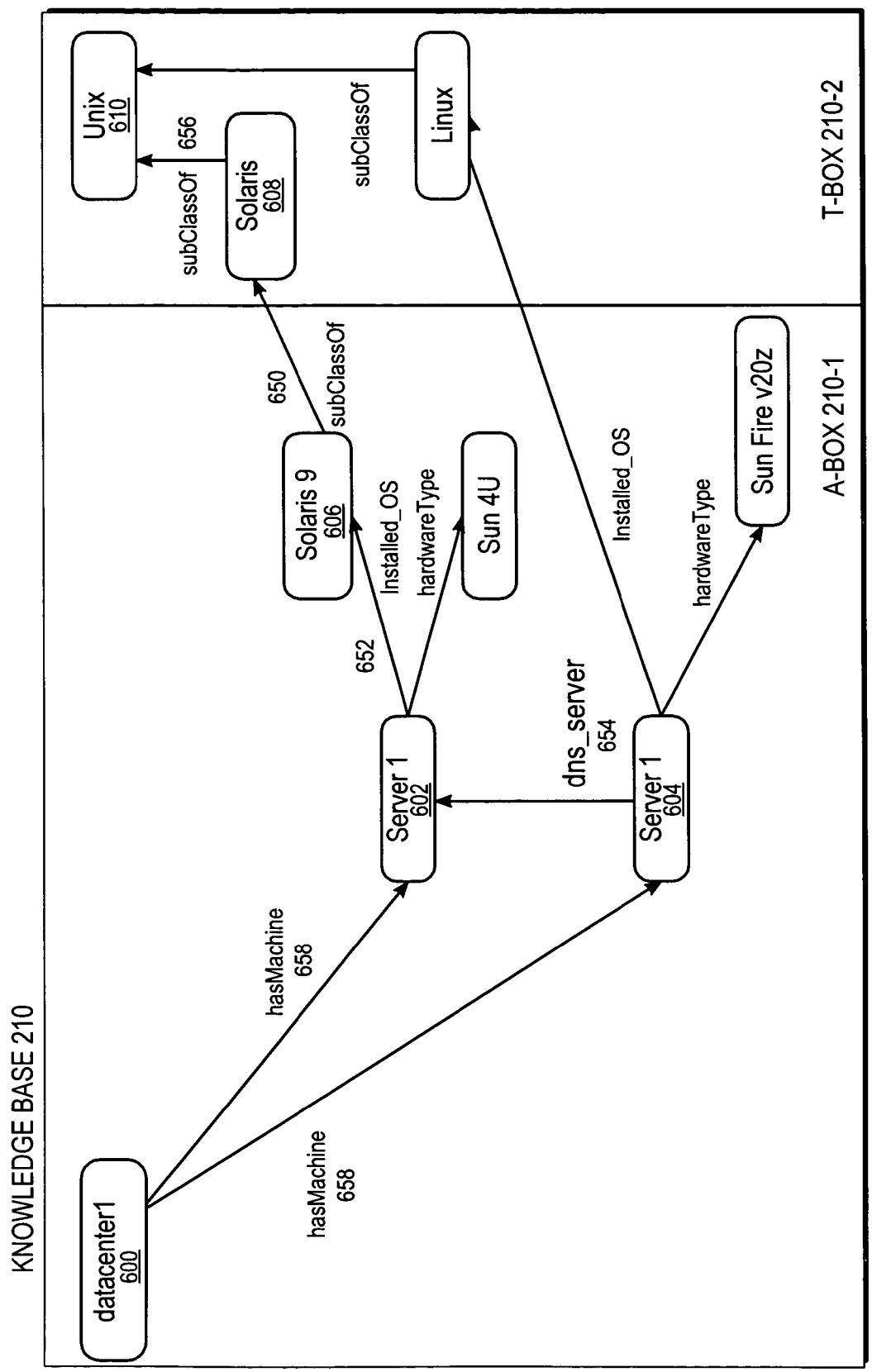
FIG. 6 is a diagram illustrating an example knowledge system produced in accordance with the example input data, rules and output data in FIGS. 5A-5D in one embodiment of the present invention.

FIG. 5B is a functional diagram that illustrates an internal representation of the information of input data 50 prepared by processing of knowledge base creator 300 in one embodiment of the present invention. As shown by FIG. 5B, an example DOM tree 60 for datacenter 500 determined from example input data 50 of FIG. 5A comprises nodes for OS 510A, OS 510B, OS 510C and OS 510D. These nodes correspond to the OS tags in the input data 50 of FIG. 5A. The content of the fields of each of these tags is stored as sub-nodes of these nodes. The knowledge base creator 300 created nodes OS 510A, OS 510B, OS 510C and OS 510D from the OS tag at line 507, the OS tag at line 506, the OS tag at line 508 and the OS tag at line 510 of the input data 50 of FIG. 5A. The additional information in each of these sections of the input data 50 is represented as sub-nodes of nodes 510A, 510B, 510C and 510D. For example, the OS node 510A, corresponding to the OS tag at line 507 of FIG. 5A, has a name node 520A, which stores the information "Unix". Similarly, the OS node 510B, corresponding to the OS tag at line 506 of FIG. 5A, has a name node 520B which stores "Solaris9" and an implements node 522B, which stores "Unix." The OS node 510C, which corresponds to the OS tag at line 508 of FIG. 5A, has a name node 520C storing "Solaris" and an implements node 522C, which stores "Unix". Although not shown in FIG. 5B for reasons of brevity, OS node 520D, which corresponds to the OS tag at line 510 of FIG. 5A, has a name node 520D storing "Linux" and an implements node 522D, which stores "Unix".

Analogously, DOM tree 60 for datacenter 500 also comprises nodes for Machine 510E and Machine 510F, which correspond to the MACHINE tags 502, 504 respectively in the input data 50 of FIG. 5A. Machine node 510E has a sub-node 520E indicating that the name of this machine is server2, a hardware_type sub-node 524E which has a sub-node 530E indicating that the hardware type of server 2 is a sun fire V20z. Machine node 510E also has an installed_OS sub-node 526E which has a sub-node 532E indicating that the Linux operating system is installed on server 2, and a DNS-_Server sub-node 528E having a server_name sub-node 534E indicating that Server 1 is the DNS Server for server 2. DOM tree 60 further includes a second machine node 510F having a sub-node 520F indicating that the name of this machine is server1, a hardware_type sub-node 524F which has a sub-node 530F indicating that the hardware type of server 1 is a sun4u, and an installed_OS sub-node 526F which has a sub-node 532F indicating that the Solaris9 operating system is installed on server 1. DOM tree 60 also includes an id node indicating that the datacenter is datacenter1.

FIG. 5C illustrates a set of rules that includes instructions for processing the nodes of the DOM tree depicted in FIG. 5B to obtain an a-box 210-1 and t-box 210-2 in one embodiment. As depicted by FIG. 5C, example rules 80 includes a plurality of instructions that indicate to the knowledge base creator 300 how to process the various tags and fields of the input data 50 in order to prepare the a-box 210-1 and t-box 210-2 of knowledge base 210A. For example, a first rule in line 540 will match the DATACENTER tag of the input data 50, and will create a resource of type Datacenter, whose id is given by the id attribute of the input data, that is, named "datacenter1".

A second rule in line 550 indicates to the knowledge base creator 300 that whenever a MACHINE tag is encountered in the input data 50, the knowledge base creator 300 should create a new resource of type Machine, with id given by the name attribute, i.e. a resource "Server1". A property named hasMachine will then be created from the datacenter1 resource to the Server1 resource.

A third rule in line 556 indicates to the knowledge base creator 300 that whenever a HARDWARE_TYPE tag is encountered in the input data 50, the knowledge base creator 300 should create a literal string resource with the value of the text inside the HARDWARE_TYPE tag, i.e. "Sun 4U" in FIG. 5A. The cardinality=1 attribute specifies that this property must have cardinality 1, that is, a Machine must have exactly one hardwareType. This requirement will be added to the knowledge base.

A fourth rule in line 558 indicates to the knowledge base creator 300 that whenever a INSTALLED_OS tag is encountered in the input data 50, the knowledge base creator 300 should create a link from the current resource (Server1) to the resource named by the text inside the INSTALLED_OS tag (i.e. Solaris 9). Likewise, the rules will match against the next set of input data tags, creating a set of resources for Server 2.

A fifth rule in line 554 indicates to the knowledge base creator 300 that whenever a DNS_SERVER tag is encountered in the input data 50, the knowledge base creator 300 should create a property called "dns_server" between "Server2" and the resource specified in the server_name attribute (i.e. Server 1).

A sixth rule in line 552 indicates to the knowledge base creator 300 that whenever an <OS> tag is encountered in the input data 50, the knowledge base creator 300 should create a class for the operating system specified by the name field of the tag. For example in FIG. 5A, a class "Unix" will be created. Then "Solaris9" will be implemented as a subclass of "Solaris", "Solaris" will be implemented as a subclass of "Unix", and "Linux" will be implemented as a subclass of "Unix". This indicates to the knowledge base that anything that applies to Solaris also applies to Solaris 9, for example.

One of ordinary skill in the art will appreciate that in some embodiments more or fewer rules may be included in the set of rules. Further, in various embodiments, schema for specifying the rules may differ widely from the example presented by FIG. 5C, which is intended as merely illustrative rather than limiting.

FIG. 5D illustrates a resulting knowledge base expressed in a standardized format. The example illustrated in FIG. 5D is in the well-known OWL format, and represents the resources, properties, and classes discussed above, other standard and non-standard formats could also be used for expressing the knowledge base. Since the OWL syntax is intended to be machine readable rather than human readable, the knowledge base 210 described by the OWL statements in FIG. 5D will be described graphically with reference to FIG. 6, which shows the key interconnections between resources in knowledge base 210.

As noted above, the knowledge base creator 300 generates the a-box 210-1 and t-box 210-2 portions of knowledge base 210 in response to the example statements of FIG. 5A according to the rules of FIG. 5C using the DOM tree 60 of FIG. 5B as an intermediary organization of the input data. Next, an example of the a-box 210-1 and t-box 210-2 created by the knowledge base creator 300 will be described with reference to FIG. 6. As depicted by FIG. 6, the knowledge base creator 300 has created an a-box 210-1 and a t-box 210-2 of a knowledge base 210 based upon the input data 50 of FIG. 5A using the rules 80 of FIG. 5B.

With reference to FIG. 6, the t-box 210-2 comprises categories and relationships among the categories. For example, t-box 210-2 includes a class SOLARIS 608 that is a sub-class of the class UNIX 610. Further, in the t-box 210-2 illustrated by FIG. 6, a class Linux is also a sub-class of the class UNIX 610. The a-box 210-1 comprises individual instances of categories specified by the t-box 210-2. For example, Solaris9 606 is related by a sub-class of link 650 to Solaris 608. Solaris9 606 is related by an Installed_OS link 652 to Server 1 602 also.

The foregoing provides an example of simultaneously generating an a-box 210-1 and t-box 210-2 illustrated by FIG. 6 from input data 50, rules 80 and output illustrated by FIGS. 5A-5D. It will be appreciated that the a-box 210-1 and t-box 210-2 have been generated by the same process, from the same input data, and according to the same rules. Accordingly, specific embodiments can provide substantially simultaneous generation of the a-box and the t-box in accordance with the techniques described, obviating any need for cross-checking between the a-box and the t-box.

In the embodiment illustrated by FIG. 1B, a particular query 92B of "Does server 2's DNS server runs UNIX?" can be answered using the knowledge base 210 of FIG. 6. As shown in FIG. 6, the knowledge base 210 includes knowledge about datacenter1 600, which includes two machines Server 1 602 and Server 2 604 linked to the datacenter 1 600 with "hasMachine" relationships 658. Server 2 604 is linked by a "dns_server" relationship 654 to Server 1 602. Further, Server 1 602 is linked by an "installed_OS" relationship 652 to Solaris9 606 in a-box 210-1. Solaris9 606 in a-box 210-1 is linked by a "subClassOf" link 650 to Solaris 608 in t-box 210-2. Solaris 608 is linked by a "subClassOf" link 656 to UNIX 610 in t-box 210-2. Accordingly, a knowledge engine 220 can determine from knowledge base 210 that Server 1 is Server 2's DNS server and that Server1 is running Solaris9 and that Solaris9 is a type of Solaris, which is a type of Unix. Thus, the knowledge engine 220 is able to determine the response to the query 92B, "Does server2's DNS run UNIX?" The system 110 is able to respond "yes".

While the present invention has been described using one example application of configuring a datacenter, the embodiments of the present invention are not limited to this implementation. For example, knowledge processing mechanisms and methods described herein may be implemented with a resource manager of a grid, a service processor computer in order to enable the service processor to make configuration and resource allocation decisions using the knowledge system, a knowledge extension to an e-commerce site, a stand knowledge workstation and other applications and implementations are contemplated.

Hardware Overview

Figure 7:
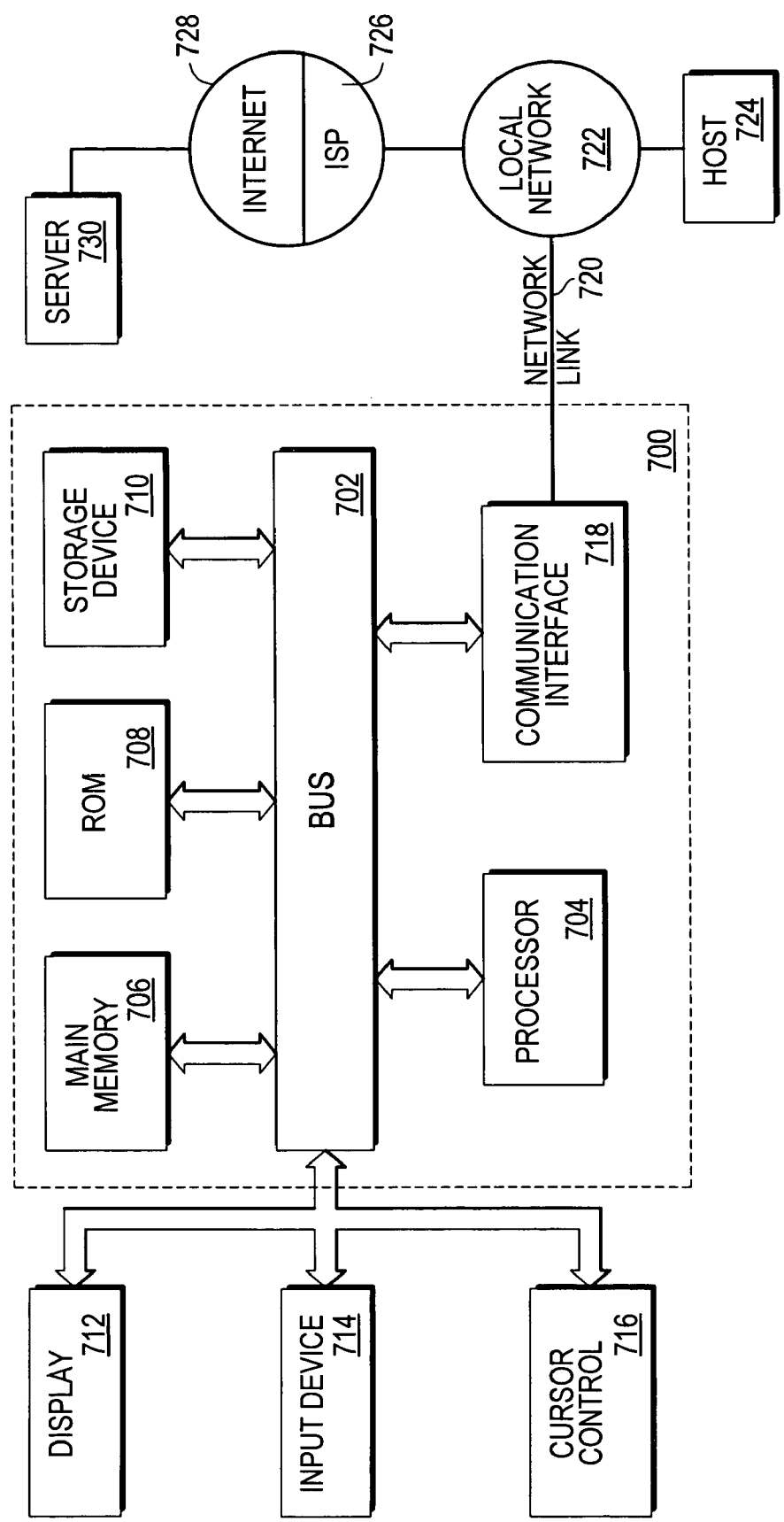
FIG. 7 is a hardware block diagram of an example computer system, which may be used to embody one or more components of an embodiment of the present invention.

FIG. 7 is a block diagram that illustrates a computer system 700 on which one embodiment of the invention may be implemented. Computer system 700 includes a bus 702 for facilitating information exchange, and one or more processors 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions by processor 704. Computer system 700 may further include a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT) or a liquid crystal display (LCD) for displaying information to a user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

In computer system 700, bus 702 may be any mechanism and/or medium that enables information, signals, data, etc., to be exchanged between the various components. For example, bus 702 may be a set of conductors that carries electrical signals. Bus 702 may also be a wireless medium (e.g. air) that carries wireless signals between one or more of the components. Bus 702 may further be a network connection that connects one or more of the components. Overall, any mechanism and/or medium that enables information, signals, data, etc., to be exchanged between the various components may be used as bus 702.

Bus 702 may also be a combination of these mechanisms/media. For example, processor 704 may communicate with storage device 710 wirelessly. In such a case, the bus 702, from the standpoint of processor 704 and storage device 710, would be a wireless medium, such as air. Further, processor 704 may communicate with main memory 706 via a network connection. In this case, the bus 702 would be the network connection. Further, processor 704 may communicate with display 712 via a set of conductors. In this instance, the bus 702 would be the set of conductors. Thus, depending upon how the various components communicate with each other, bus 702 may take on different forms. Bus 702, as shown in FIG. 7, functionally represents all of the mechanisms and/or media that enable information, signals, data, etc., to be exchanged between the various components.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, it should be noted that although the invention has been described with reference to various embodiments, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A machine implemented method, comprising:
receiving a set of rules, specifying actions to be taken in response to finding specific types of input data and a format of an output t-box;
receiving a first set of input information, in a format satisfying the rules; wherein the input information has sufficient structure to enable rules to be applied to the input information to determine individual fields therefrom;
generating from the first set of input information and the set of rules a t-box comprising categories and relationships about categories, and an a-box comprising assertions of individual instances of the categories of the t-box, wherein the a-box is generated by applying the set of rules to the first set of input information, and wherein the t-box and the a-box are generated concurrently such that the a-box is generated while the t-box is being generated;
generating a Web Ontology Language ("OWL") database using the a-box and the t-box; and
generating a knowledge base based on OWL statements of the OWL database,
wherein the method is performed by a computer executing program instructions.

2. The method of claim 1, further comprising:
receiving a second set of input information, the second set of input information differing from the first set of input information; and
generating a revised t-box and a revised a-box based upon the second set of input information and the set of rules; wherein the revised t-box includes at least one category or relationship not present in the t-box and correlating to data in the revised a-box.

3. The method of claim 1, wherein generating from the first set of input information and the set of rules a t-box comprising categories and relationships about categories and an a-box comprising assertions of individual instances of the categories of the t-box comprises:
reading the set of rules;
generating a portion of t-box information from a portion of the set of rules;
reading and parsing the input information to form an internal representation;
analyzing the internal representation against at least one rule of the set of rules to generate a result comprising at least one of an instance, a property instance and a t-box statement; and
outputting the result.

4. The method of claim 3, wherein analyzing the internal representation comprises at least one of:
walking a Document Object Model ("DOM") tree and processing a Simple API for XML ("SAX") event.

5. The method of claim 1, wherein the first set of input information comprises statements in a markup language.

6. The method of claim 5, wherein the markup language describes a datacenter.

7. The method of claim 6, wherein the markup language comprises eXtended Markup Language ("XML").

8. The method of claim 1, wherein receiving a first set of input information further comprises:
reading the first set of input information from a database.

9. The method of claim 1, further comprising:
providing the result to a process that writes a Web Ontology Language ("OWL") statement.

10. The method of claim 1, wherein the set of rules comprises instructions for processing tags of a markup language.

11. A machine-readable storage medium carrying one or more sequences of instructions for creating a knowledge base, which instructions, when executed by one or more processors, cause the one or more processors to carry out the steps of:
receiving a set of rules, specifying actions to be taken in response to finding specific types of input data and a format of an output t-box;
receiving a first set of input information, in a format satisfying the rules; wherein the input information has sufficient structure to enable rules to be applied to the input information to determine individual fields therefrom;
generating from the first set of input information and the set of rules a t-box comprising categories and relationships about categories, and an a-box comprising assertions of individual instances of the categories of the t-box, wherein the a-box is generated by applying the set of rules to the first set of input information, and wherein the t-box and the a-box are generated concurrently such that the a-box is generated while the t-box is being generated;
generating a Web Ontology Language ("OWL") database using the a-box and the t-box; and
generating a knowledge base based on OWL statements of the OWL database.

12. The machine-readable storage medium of claim 11, wherein the instructions for creating a knowledge base further comprise instructions for carrying out the steps of:
receiving a second set of input information, the second set of input information differing from the first set of input information; and
generating a revised t-box and a revised a-box based upon the second set of input information and the set of rules; wherein the revised t-box includes at least one category or relationship not present in the t-box and correlating to data in the revised a-box.

13. The machine-readable storage medium of claim 11, wherein the instructions for generating from the first set of input information and the set of rules a t-box comprising categories and relationships about categories and an a-box comprising assertions of individual instances of the categories of the t-box comprise instructions for carrying our the steps of:
reading the set of rules;
generating a portion of t-box information from a portion of the set of rules;
reading and parsing the input information to form an internal representation;
analyzing the internal representation against at least one rule of the set of rules to generate a result comprising at least one of an instance, a property instance and a t-box statement; and
outputting the result.

14. The machine readable storage medium of claim 13, wherein the instructions for analyzing the internal representation comprise instructions for carrying out at least one of the steps of:

walking a Document Object Model ("DOM") tree and processing a Simple API for XML ("SAX") event.

15. The machine-readable storage medium of claim 11, wherein the first set of input information comprises statements in a markup language.

16. The machine-readable storage medium of claim 15, wherein the markup language describes a datacenter.

17. The machine-readable storage medium of claim 16, wherein the markup language comprises extended Markup Language ("XML").

18. The machine-readable storage medium of claim 11, wherein instructions for receiving a first set of input information further comprise instructions for carrying out the step of:
reading the first set of input information from a database.

19. The machine-readable storage medium of claim 11, wherein the instructions for creating a knowledge base further comprise instructions for carrying out the steps of:
providing the result to a process that writes a Web Ontology Language ("OWL") statement.

20. The machine-readable storage medium of claim 11, wherein the set of rules comprises instructions for processing tags of a markup language.

21. An apparatus, comprising:
means for receiving a set of rules, specifying actions to be taken in response to finding specific types of input data and a format of an output t-box;
means for receiving a first set of input information, in a format satisfying the rules; wherein the input information has sufficient structure to enable rules to be applied to the input information to determine individual fields therefrom;
means for generating from the first set of input information and the set of rules a t-box comprising categories and relationships about categories, and an a-box comprising assertions of individual instances of the categories of the t-box, wherein the a-box is generated by applying the set of rules to the first set of input information, and wherein the t-box and the a-box are generated concurrently such that the a-box is generated while the t-box is being generated;
means for generating a Web Ontology Language ("OWL") database using the a-box and the t-box; and
means for generating a knowledge base based on OWL statements of the OWL database.

22. An apparatus for generating a knowledge system, comprising:
one or more processors;
a memory; connected to the processors by a bus; and
one or more stored sequences of instructions which, when executed by the one or more processors, cause the one or more processors to carry out the steps of:
receiving a set of rules, specifying actions to be taken in response to finding specific types of input data and a format of an output t-box;
receiving a first set of input information, in a format satisfying the rules; wherein the input information has sufficient structure to enable rules to be applied to the input information to determine individual fields therefrom;
generating from the first set of input information and the set of rules a t-box comprising categories and relationships about categories, and an a-box comprising assertions of individual instances of the categories of the t-box, wherein the a-box is generated by applying the set of rules to the first set of input information, and wherein the t-box and the a-box are generated concurrently such that the a-box is generated while the t-box is being generated;
generating a Web Ontology Language ("OWL") database using the a-box and the t-box; and
generating a knowledge base based on OWL statements of the OWL database.

23. The apparatus of claim 22, wherein the one or more stored sequences of instructions further comprise instructions for carrying out the steps of:
receiving a second set of input information, the second set of input information differing from the first set of input information; and
generating a revised t-box and a revised a-box based upon the second set of input information and the set of rules;
wherein the revised t-box includes at least one category or relationship not present in the t-box and correlating to data in the revised a-box.

24. The apparatus of claim 22, wherein the instructions for generating from the first set of input information and the set of rules a t-box comprising categories and relationships about categories and an a-box comprising assertions of individual instances of the categories of the t-box comprise instructions for carrying out the steps of:
reading the set of rules;
generating a portion of t-box information from a portion of the set of rules;
reading and parsing the input information to form an internal representation;
analyzing the internal representation against at least one rule of the set of rules to generate a result comprising at least one of an instance, a property instance and a t-box statement; and
outputting the result.

25. The apparatus of claim 24, wherein the instructions for analyzing the internal representation comprise instructions for carrying out at least one of the steps of:
walking a Document Object Model ("DOM") tree and processing a Simple API for XML ("SAX") event.

26. The apparatus of claim 22, wherein the first set of input information comprises statements in a markup language.

27. The apparatus of claim 26, wherein the markup language describes a datacenter.

28. The apparatus of claim 27, wherein the markup language comprises eXtended Markup Language ("XML").

29. The apparatus of claim 22, wherein instructions for receiving a first set of input information further comprise instructions for carrying our the step of:
reading the first set of input information from a database.

30. The apparatus of claim 22, wherein the instructions for creating a knowledge base further comprise instructions for carrying out the steps of:
providing the result to a process that writes a Web Ontology Language ("OWL") statement.

31. The apparatus of claim 22, wherein the set of rules comprises instructions for processing tags of a markup language.

* * * * *

UNITED STATES PATENT AND TRADEMARK OFFICE
CERTIFICATE OF CORRECTION

| | | |
|---|---|---|
| PATENT NO. | : 7,606,785 B1 | Page 1 of 1 |
| APPLICATION NO. | : 10/923291 | |
| DATED | : October 20, 2009 | |
| INVENTOR(S) | : Kenneth Shirriff | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1438 days.

Signed and Sealed this

Twelfth Day of October, 2010

David J. Kappos
*Director of the United States Patent and Trademark Office*